United States Patent [19]

Siegman et al.

[11] 4,188,591
[45] Feb. 12, 1980

[54] RF EXCITED MERCURY LASER LAMP

[75] Inventors: Anthony E. Siegman; Neil C. Holmes, both of Stanford; Max T. Artusy, Mt. View, all of Calif.

[73] Assignee: The United States of America as represented by the Secretary of the Air Force, Washington, D.C.

[21] Appl. No.: 840,353

[22] Filed: Oct. 7, 1977

[51] Int. Cl.$^2$ .................................... H01S 3/092
[52] U.S. Cl. ........................ 331/94.5 P; 313/220
[58] Field of Search ............ 331/94.5 P, 94.5 D, 331/94.5 G, 94.5 R; 313/220

[56] References Cited

U.S. PATENT DOCUMENTS

| | | | |
|---|---|---|---|
| 3,535,653 | 10/1970 | Zarowin | 331/94.5 G |
| 3,541,371 | 11/1970 | Legros et al. | 331/94.5 G X |
| 3,659,220 | 4/1972 | Erickson | 331/94.5 G |
| 3,992,683 | 11/1976 | Djeu et al. | 331/94.5 G |
| 4,032,862 | 6/1977 | Huchital et al. | 331/94.5 P |

OTHER PUBLICATIONS

Bell, "Ring Discharge Excitation of Gas Ion Lasers", *Applied Physics Letters*, vol. 7, No. 7, Oct. 1, 1965, pp. 190-191.
Huchital et al., "Pumping of Nd:YAG with Electrodeless Arc Lamps", *IEEE J. of Quantum Electronics*, vol. QE-12, No. 1, Jan. 1976, pp. 1-3.
Sinclair et al., *Gas Laser Technology*, Holt, Rinehart and Winston, Inc., N. Y., 1969, pp. 129, 130, 141-145.
Goldsborough et al., RF "Induction Excitation of CW Visible Laser Transitions in Ionized Gases", *App. Phy. Let.* vol. 8, No. 6, Mar. 15, 1966, pp. 137-139.
Artusy et al., "DC-Excited and Sealed-Off Operation of the Optically Pumped 546.1-nm Hg Laser", *App. Phy. Let.*, vol. 28, No. 3, Feb. 1, 1976, pp. 133-134.

*Primary Examiner*—James W. Davie
*Attorney, Agent, or Firm*—Joseph E. Rusz; Jacob N. Erlich

[57] ABSTRACT

An optically pumped laser wherein the optical pumping means is in the form of a mercury discharge lamp and a radio-frequency excited coil surrounding the lamp. The discharge lamp is constructed in the form of a closed loop and is inductively excited by the high power radio-frequency coil. The coil forms the primary coil and the lamp the secondary coil of an air-core transformer. Current in the lamp is excited entirely by the radio frequency magnetic fields passing through the plane of the lamp thereby optically pumping the lasing medium.

6 Claims, 3 Drawing Figures

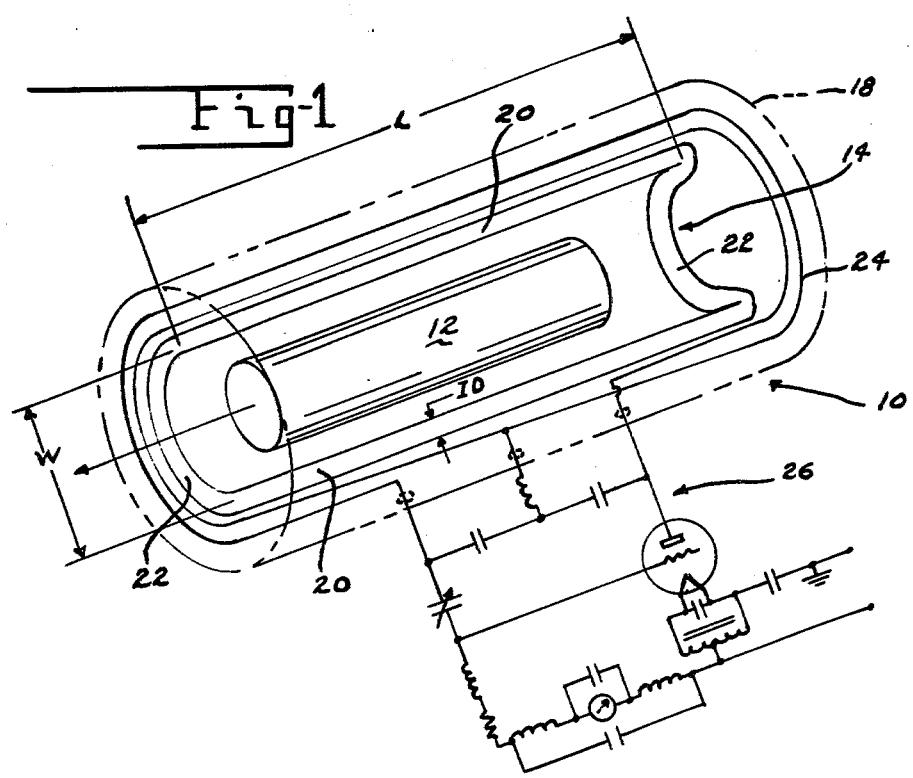
Fig-1
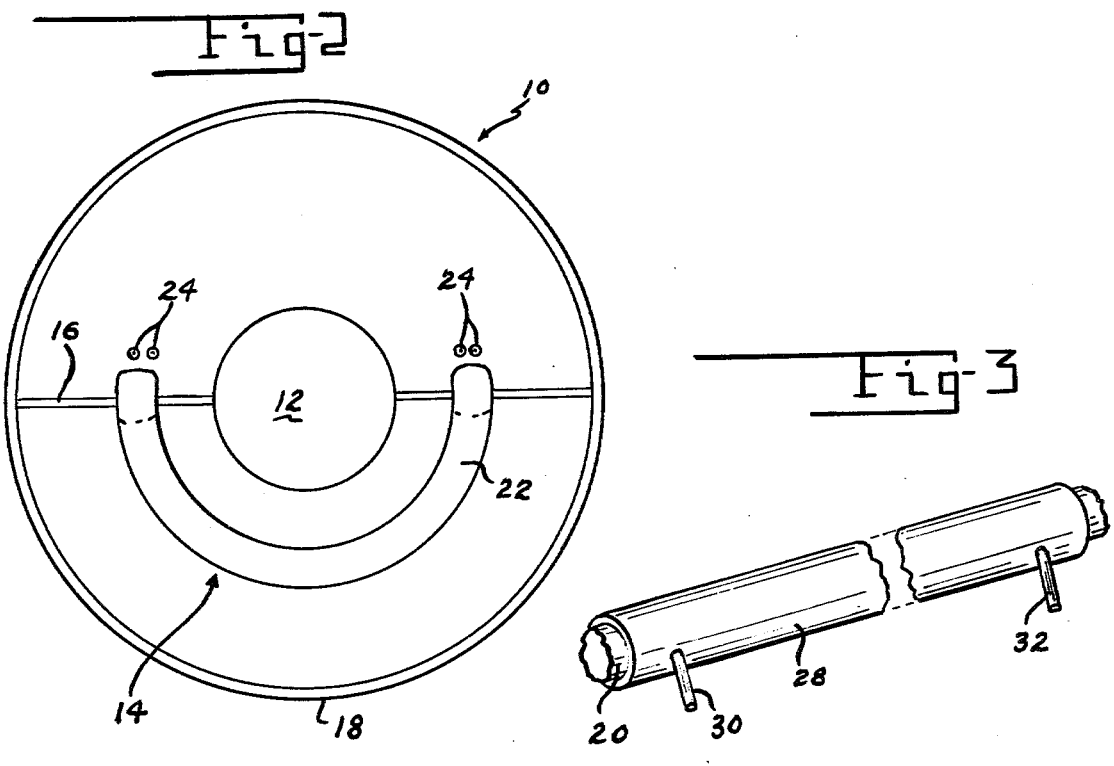
Fig-2
Fig-3

RF EXCITED MERCURY LASER LAMP

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optically pumped lasers, and, in particular to a mercury laser which incorporates therein an RF excited mercury discharge lamp for optically pumping the lasing medium.

The optically pumped mercury laser has been in existence for a relatively short period of time. This laser has many potential applications as, for example, a general purpose low power visible laser, a laser wavelength standard or for laser gyroscope applications.

A typical optically pumped mercury laser utilizes a water jacketed laser tube having conventional Brewster windows mounted on greaseless O-ring taper joints. High reflectivity mirrors are used to form a long-radius optical cavity. The laser tube and the thin deionized water jacket are generally made of fused silica. Extremely pure tank nitrogen is flowed into the laser tube over a drop of natural isotopic-ratio Hg placed in the bottom of a small U-tube bend. The $N_2$-Hg mixture is pumped through the laser tube at slow flow rates by a trapped mechanical pump. The Hg vapor pressure is controlled by controlling the temperature of the U tube, with the laser tube itself being kept slightly warmer to avoid Hg condensation. Optical pumping of the laser tube is accomplished by two standard Hg germicidal lamps in a polished double-elliptical pump cavity.

An operative example of such an optically pumped mercury laser is set forth in an article by Max Artusy, Neil Holmes and Anthony Siegman entitled "DC Excited and Sealed-Off Operation of the Optically Pumped 546.1-nm Hg Laser", Applied Physics Letters 28, 133–134 (Feb. 1, 1976).

Various types of mercury discharge lamps have been extensively developed for more than 50 years. Mercury lamps are widely available in commercial models, both as low-pressure glow discharge lamps which are efficient producers of ultraviolet light, used for germicidal lamps and other purposes; and as high-pressure arc-discharge lamps used as efficient visible light sources. The properties of mercury discharge lamps of different types are extremely diverse.

For pumping the mercury laser one requires a mercury discharge lamp that emits only two of the many characteristic mercury discharge lines, at 2537 A and 4047 A, with high efficiency and brightness but with a very narrow bandwidth for each of those lines. In general, the physical requirements for achieving all of these purposes at once are contradictory. Increasing the discharge current and/or the gas pressure in conventional mercury lamps increases the radiative efficiency and the total light output from the discharge. However, the spectral width (bandwidth, linewidth) of the emitted lines generally increases at the same time, and a phenomenon known as "self-reversal" generally appears. This phenomenon refers to the property that the discharge lamps at higher pressures and currents actually emits less radiation and becomes less bright at the exact center frequency of the radiative transitions, while emitting much more energy in the wings of the transitions, that is to say, at wavelengths located slightly to either side of the exact transition frequencies.

The optically pumped mercury laser, however, is effectively pumped only by radiation which is exactly at the center wavelengths of the two transition frequencies mentioned. Self-reversal must therefore be avoided or eliminated in lamps for pumping this laser.

Cataphoresis is another significant problem in mercury discharge lamps. As the discharge current is increased, particularly at low pressures where self-reversal might be avoided, the mercury vapor is transported or pumped by the discharge current itself in a direction from the anode end to the cathode end of the discharge, where the mercury condenses and freezes out. At higher discharge currents this phenomena can rapidly transfer all of the mercury in a lamp to the cathode end, and thus terminate the operation of the lamp.

Furthermore, conventional dc current excited mercury lamps suffer both electrode deterioration due to sputtering and other phenomena, and discharge instabilities and noise fluctuations due to processes that are inherent to dc discharges.

It is therefore clearly obvious from the problems set forth hereinabove that the development of an optically pumped mercury laser utilizing an optical pumping source which alleviates these problems is becoming a necessity.

SUMMARY OF THE INVENTION

The optically pumped mercury laser of this invention incorporates therein an RF excited mercury discharge lamp which overcomes the problems set forth hereinabove.

The essence of this invention is the RF excited mercury discharge lamp within a mercury laser constructed in the form of a closed rectangular loop with no internal electrodes. This loop is inductively excited by a high-power radio-frequency coil made up of one or several turns which is placed close to the lamp. The lamp forms a closed single-turn secondary coil of an air-core transformer with the radio-frequency excitation coil forming the primary. The current in the lamp is thus excited entirely by the radio-frequency magnetic fields passing through the plane of the lamp. The radio-frequency currents in the lamp itself flow around the lamp in a closed path, oscillating in direction at the radio frequency. Thus there are no electrodes, cathodes or anodes required in the lamp of this invention.

Because there are no electrodes in the lamp of this invention, and because the discharge currents and the accelerating fields are everywhere parallel rather than perpendicular to the walls of the discharge tube, mercury ions will not be driven into the walls of the lamp where they may become more or less permanently embedded, as happens in other lamps. This should increase lamp lifetime and decrease the amount of mercury required to obtain long-term operation of the lamp.

In addition, the current direction in the lamp of the instant invention reverses at a high frequency, and as a result thereof, there will be no net mercury transfer due to cataphoresis, and hence complete elimination of this problem.

For the best performance of the instant invention, both the mercury laser tube and its associated mercury lamp are generally constructed using a single isotope of mercury which is extremely expensive. Since the rf-excited lamp of this invention will only require a minimal amount of the expensive single mercury isotope, and this material will not be lost to cleanup or to cataphoresis the overall operation of the lamp is relatively economical.

It is therefore an object of this invention to provide an RF excited mercury discharge lamp capable of optically pumping the lasing medium within the laser tube of a mercury laser.

It is a further object of this invention to provide an RF excited mercury laser lamp which does not require electrodes, cathodes or anodes.

It is still a further object of this invention to provide an RF excited mercury laser lamp which eliminates the problem of cataphoresis.

It is another object of this invention to provide a mercury laser which is extremely efficient in operation.

It is still another object of this invention to provide an RF excited mercury discharge lamp for use with a mercury laser which is economical to produce and which utilizes conventional currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DETAILED DESCRIPTION OF THE DRAWING

FIG. 1 is a pictorial representation, shown partially in schematic fashion, of the optically pumped mercury laser of this invention;

FIG. 2 is a side elevational view of the optically pumped mercury laser of this invention; and FIG. 3 is a segmented pictorial representation of a portion of a leg of the RF excited mercury laser lamp utilized with the optically pumped mercury laser of this invention showing in particular the cooling jacket.

DETAILED DESCRIPTION OF THE PREFERRED EMBODIMENT

Reference is now made to FIG. 1 of the drawing which best illustrates the optically pumped mercury laser 10 of this invention. Laser 10 is preferably a mercury laser oscillating at 5461 A and incorporates therein a conventional water jacketed laser tube 12 having conventional Brewster windows mounted on greaseless O-ring taper joints and highly reflective mirrors which form the optical cavity (not shown). Surrounding laser tube 12 is a mercury discharge lamp 14. Lamp 14 forms a closed rectangular loop about laser tube 12. Any suitable supporting structure such as a plurality of rods 16 (best shown in FIG. 2 of the drawing) fixedly position both discharge lamp 14 and laser tube 12 within any suitable reflective housing 18.

As shown in FIGS. 1 and 2, mercury discharge lamp 14 has a pair of elongated legs 20, which are positioned parallel to the longitudinal axis of laser tube 12. Each leg 20 has a length, L, of between 30 cm and 1 m depending upon the length of laser tube 12. Legs 20 of discharge lamp 14 terminate at each end in a semicircular end portion 22 with the width, W, between the two legs 20 being approximately 5-10 centimeters. Laser tube 12 is preferably situated adjacent lamp 14 being placed proximate one of the elongated legs 20 or between the two legs 20 as shown in FIG. 1 of the drawing.

Lamp 14 has an inner diameter, ID, of approximately 4 mm in each of the two elongated legs 20. Furthermore, lamp 14 is generally filled with a buffer gas of argon or helium at a typical pressure of 300 Torr, together with mercury vapor at the mercury vapor pressure corresponding to a temperature of approximately 40° to 50° centigrade. Since lamp 14 can be made entirely of an inert material such as chemically inert quartz and does not contain electrodes or electrode seals, the same lamp design set forth in this invention can be used with other corrosive materials or vapors, such as cadmium or chloride, which may be used in other similar lamp applications.

In the instant invention lamp 14 is utilized as a single-turn secondary coil of an R-F coil transformer. The primary coil 24 is in the form of a plurality of turns of copper tubing preferably wound around the outside of lamp 14. Since coil 24 is in the form of tubing it can also be used for the cooling thereof. The power input to the primary excitation coil 24 of this invention is provided by any conventional radio frequency oscillator 26 at a frequency typically in the range between 10 and 100 MHz, with a power input of approximately 500 W. Although the above limits provide optimum operativeness of the invention, they can be varied by factors of at least two without changing the basic characteristics of lamp 14. An example of a conventional radio frequency oscillator 26 is set forth in detail on page 145 in an article by Douglas C. Sinclair and W. Earl Bell, Gas Laser Technology, Holt, Reinhart and Winston Inc., New York, 1969.

With laser 10 of this invention optical pumping is easily accomplished since it is possible to generate radio frequency signals with high efficiency in conventional electronic oscillators 26 of the type set forth hereinabove. It is also possible to couple this energy with reasonably high efficiency into the radio frequency discharge. Also, with the instant invention, energy losses in the discharge itself due to electrode effects or to cathode and anode voltage drops are eliminated. Therefore, one can expect the radio-frequency-excited lamp 14 of this invention to be extremely efficient in operation.

The line reversal problem associated with conventional DC-discharge mercury lamps result at higher mercury vapor and discharge currents than take place in the instant invention because the DC current flow is concentrated on the center of the lamp producing emission primarily from hot and intensely excited mercury atoms near the axis of the lamp. The radiation from these atoms is then partially absorbed from cooler atoms near the walls of the discharge lamp, thereby producing self-reversal. With radio-frequency-excitation as used with the instant invention the current flow is distributed more uniformly across the entire transverse section of lamp 14 thereby leading to a more uniform excitation and thereby reducing or substantially eliminating the unwanted self-reversal procedure.

In addition, as shown in FIG. 3 of the drawing the legs 20 of lamp 14 may be cooled by a conventional cooling jacket 28 which surrounds legs 20. Cooling fluid passes through jacket 28 by entering inlet 30 and exiting through outlet 32. Any suitable reflector 18 made of for example aluminum surrounds the coil 24, lamp 14 and laser tube 12 as in any other conventional laser.

Although this invention has been described with reference to a particular embodiment, it will be understood to those skilled in the art that this invention is also capable of further and other embodiments within the spirit and scope of the appended claims.

I claim:

1. In an optically pumped mercury laser having a laser tube, a lasing medium located within said laser tube and means operably connected to said laser tube for optically pumping said lasing medium, the improvement therein residing in said optical pumping means, said optical pumping means comprising a mercury discharge lamp in operable relationship with said laser tube, said mercury discharge lamp having a pair of hollow elongated legs spaced apart from each other and being disposed on opposite sides of and lying in the same plane as said laser tube, a hollow end portion interconnecting said legs at each end thereof, each of said end portions being positioned substantially perpendicular to the longitudinal axis of said legs, said discharge lamp thereby forming a closed rectangular loop surrounding and being substantially coaxial with said laser tube, a gas contained within said hollow legs and said end portions of said lamp, a radio-frequency excited coil, said coil being wound around the outside of said lamp in a direction substantially parallel to said legs and said end portions, respectively, of said lamp, thereby being in operable relationship with said lamp and a radio-frequency power supply operably connected to said coil whereby said radio-frequency excited coil forms the primary coil and said lamp forms the secondary coil of an air-core transformer, the current in said lamp being excited entirely by radio-frequency magnetic fields passing through said lamp.

2. In an optically pumped laser as defined in claim 1 wherein said radio-frequency power supply is in the form of a radio-frequency oscillator.

3. In an optically pumped laser as defined in claim 2 wherein said radio-frequency excited coil is made of copper tubing.

4. In an optically pumped laser as defined in claim 3 wherein said rectangular shaped mercury discharge lamp has a length of between 30 cm and 1 m and a width between 5–10 cm.

5. In an optically pumped laser as defined in claim 4 wherein the inner diameter of each of said legs being approximately 4 mm.

6. In an optically pumped laser as defined in claim 5 wherein said mercury discharge lamp is made of a chemically inert material.

* * * * *